(12) United States Patent
Brusky et al.

(10) Patent No.: US 10,147,574 B2
(45) Date of Patent: *Dec. 4, 2018

(54) FUSE AND TRIP MECHANISM THEREFOR

(71) Applicant: EATON CORPORATION, Cleveland, OH (US)

(72) Inventors: Nicholas P. Brusky, Milwaukee, WI (US); Robert N. Parry, Beaver, PA (US); James J. Benke, Pittsburgh, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/287,032

(22) Filed: Oct. 6, 2016

(65) Prior Publication Data

US 2017/0025238 A1   Jan. 26, 2017

Related U.S. Application Data

(62) Division of application No. 13/940,319, filed on Jul. 12, 2013, now Pat. No. 9,490,093.

(51) Int. Cl.
| H01H 85/02 | (2006.01) |
| H02H 1/00 | (2006.01) |
| H01H 71/20 | (2006.01) |
| H02H 3/093 | (2006.01) |
| H02H 3/08 | (2006.01) |
| H01H 85/00 | (2006.01) |
| H01H 39/00 | (2006.01) |
| H02H 3/00 | (2006.01) |

(52) U.S. Cl.
CPC .......... H01H 39/006 (2013.01); H01H 71/20 (2013.01); H01H 85/0039 (2013.01); H01H 85/02 (2013.01); H02H 1/0092 (2013.01); H02H 3/006 (2013.01); H02H 3/08 (2013.01); H02H 3/0935 (2013.01); *H01H 2085/0266* (2013.01)

(58) Field of Classification Search
CPC .... H01H 85/02; H01H 85/0039; H01H 71/20; H01H 2085/0266; H02H 3/0935; H02H 3/08; H02H 3/006; H02H 1/0092
USPC ................ 337/143, 148, 150, 151, 157, 165
See application file for complete search history.

(56) References Cited

U.S. PATENT DOCUMENTS

| 2,342,310 | A | * | 2/1944 | Taylor | ..................... | H01H 85/36 |
| | | | | | | 337/165 |
| 2,769,059 | A | * | 10/1956 | Baenziger | .............. | H01H 85/36 |
| | | | | | | 337/233 |
| 2,934,625 | A | * | 4/1960 | Patrichi | .................. | H01H 11/00 |
| | | | | | | 337/148 |

(Continued)

*Primary Examiner* — Anatoly Vortman
(74) *Attorney, Agent, or Firm* — Eckert Seamans

(57) ABSTRACT

A trip mechanism for a fuse includes a trip unit disposed within an elongated housing of the fuse, and a processor. The trip unit includes a fuse element and an actuator for severing the fuse element. The processor is in electrical communication with the trip unit, and is adapted to monitor electrical current. Responsive to the processor detecting a predetermined prescribed electrical current, the processor is adapted to signal the actuator to sever the fuse element. The processor is programmable to selectively adjust the predetermined prescribed electrical current, thereby enabling the fuse to have a plurality different current ratings.

1 Claim, 5 Drawing Sheets

(56) References Cited

U.S. PATENT DOCUMENTS

| | | | | |
|---|---|---|---|---|
| 3,003,045 A | * | 10/1961 | Tichenor | H01H 3/00 200/296 |
| 3,155,800 A | * | 11/1964 | Denton | H01H 37/76 200/61.08 |
| 3,517,366 A | * | 6/1970 | Patrichi | H01H 71/20 337/148 |
| 3,684,923 A | | 8/1972 | Keeler, II | |
| 3,728,583 A | | 4/1973 | Wickson | |
| 3,761,856 A | * | 9/1973 | Mantelet | A47J 27/004 337/409 |
| 3,855,563 A | | 12/1974 | Cameron et al. | |
| 3,868,552 A | | 2/1975 | Wickson | |
| 3,958,206 A | | 5/1976 | Klint | |
| 3,964,010 A | * | 6/1976 | Okazaki | H01H 85/36 337/148 |
| 4,124,835 A | | 11/1978 | Cahill, Jr. | |
| 4,342,978 A | | 8/1982 | Meister | |
| 4,352,082 A | * | 9/1982 | Barry | H01H 37/76 337/407 |
| 4,520,337 A | | 5/1985 | Cameron | |
| 4,538,133 A | | 8/1985 | Pflanz | |
| 4,559,513 A | * | 12/1985 | Gaia | H01H 85/36 337/163 |
| 4,661,807 A | | 4/1987 | Panaro | |
| 4,906,962 A | * | 3/1990 | Duimstra | H01H 61/04 337/148 |
| 5,831,507 A | * | 11/1998 | Kasamatsu | H01H 9/10 337/299 |
| 6,141,202 A | | 10/2000 | Maeckel et al. | |
| 6,157,286 A | * | 12/2000 | Ranjan | H01H 85/46 337/12 |
| 6,194,988 B1 | | 2/2001 | Yamaguchi et al. | |
| 6,335,852 B1 | * | 1/2002 | Nimmo | H02H 3/0935 361/93.2 |
| 6,411,190 B1 | | 6/2002 | Yamaguchi et al. | |
| 6,492,747 B1 | | 12/2002 | Hoffmann | |
| 7,050,281 B2 | | 5/2006 | Ohta et al. | |
| 7,078,635 B2 | * | 7/2006 | Kordel | H01H 39/006 200/61.08 |
| 7,222,561 B2 | * | 5/2007 | Brede | B23D 15/145 200/61.08 |
| 7,348,872 B1 | | 3/2008 | Parry et al. | |
| 7,511,600 B2 | * | 3/2009 | Von Behr | H01H 39/006 200/61.08 |
| 8,581,686 B2 | * | 11/2013 | Galla | H01H 37/761 29/623 |
| 9,761,401 B1 | * | 9/2017 | Vega | H01H 85/0039 |
| 2005/0083164 A1 | * | 4/2005 | Caruso | H01H 39/006 337/157 |
| 2006/0049027 A1 | | 3/2006 | Iversen | |
| 2008/0165461 A1 | | 7/2008 | Paik et al. | |
| 2010/0231347 A1 | * | 9/2010 | Knab | H01H 37/761 337/143 |
| 2010/0328014 A1 | | 12/2010 | Suzuki et al. | |

* cited by examiner

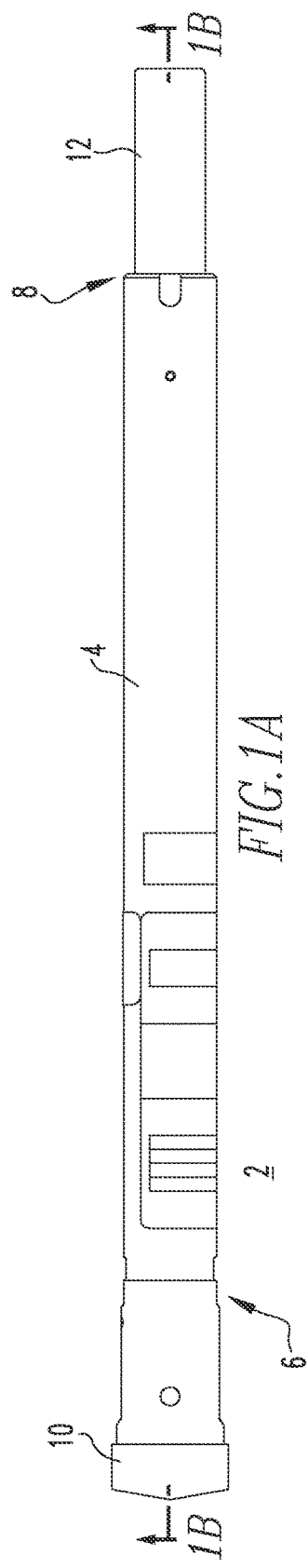
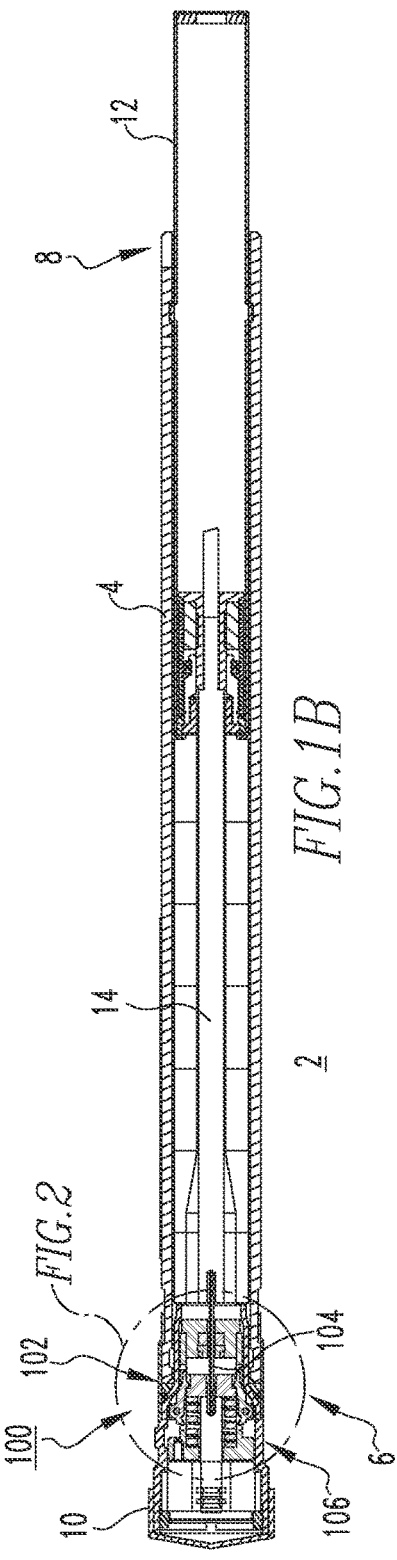

FUSE AND TRIP MECHANISM THEREFOR

CROSS-REFERENCE TO RELATED APPLICATIONS

This application is a divisional of, and claims priority under 35 U.S.C. § 120 from, U.S. patent application Ser. No. 13/940,319, filed Jul. 12, 2013, entitled "FUSE AND TRIP MECHANISM THEREFOR", the contents of which are incorporated herein by reference.

BACKGROUND

Field

The disclosed concept relates generally to fuses and, more particularly, to fuses such as, for example, expulsion fuses. The disclosed concept also relates to trip mechanisms for fuses.

Background Information

Traditionally, fuses are relatively simple thermal devices. A medium voltage current-limiting fuse, for example, generally includes at least one element (e.g., without limitation, wire) having known electrical resistance and thermal properties matched to an application such that when a predetermined electrical current is supplied, the wire or solder connection melts, thereby triggering the fuse to interrupt the flow of electrical current. In such fuses, this action is the only means to trigger the fuse to interrupt current flow. Accordingly, fuses are generally designed (and correspondingly rated) to allow the flow of an electrical current up to a certain current threshold. Once the current threshold is exceeded, the element of the fuse opens, thereby protecting the power circuit from the overcurrent condition.

Electronically controlled fuse technology has been developed, wherein the flow of electrical current is monitored by a processor, and a fuse/switch combination is employed to interrupt the circuit under certain predetermined conditions (e.g., without limitation, a current overload). Specifically, a high-speed switch is placed in parallel with a traditional current-limiting fuse to shunt the electrical current away from the fuse and through the high-speed switch. When the processor detects the predetermined fault condition, an electronic signal is sent to the high-speed switch to open the switch and transfer all of the current through the fuse. The fuse then interrupts the circuit. There are, however, a number of disadvantages associated with such systems, including the fact that high-speed switches are expensive, which in turn makes such electronically controlled fuses costly to manufacture.

There is, therefore, room for improvement in fuses, and in trip mechanism therefor.

SUMMARY

These needs and others are met by embodiments of the disclosed concept, which are directed to a trip mechanism for a fuse, which among other benefits is selectable to change the rating of the fuse for use in a variety of different applications.

As one aspect of the disclosed concept, a trip mechanism is provided for a fuse. The fuse comprises an elongated housing including a first end and a second end, a first electrical terminal coupled to the first end, a second electrical terminal coupled to the second end, and a contact member disposed within the elongated housing. The trip mechanism comprises: a trip unit structured to be disposed within the elongated housing, the trip unit comprising a fuse element and an actuator for severing the fuse element; and a processor in electrical communication with the trip unit. The processor is adapted to monitor electrical current. Responsive to the processor detecting a predetermined prescribed electrical current, the processor is adapted to signal the actuator to sever the fuse element. The processor is programmable to selectively adjust the predetermined prescribed electrical current, thereby enabling the fuse to have a plurality different current ratings.

The actuator may comprise a cutting mechanism for cutting the fuse element and a biasing member for biasing the cutting mechanism toward the fuse element.

As another aspect of the disclosed concept, a fuse comprises: an elongated housing including a first end and a second end; a first electrical terminal coupled to the first end; a second electrical terminal coupled to the second end; a contact member disposed within the elongated housing; and a trip mechanism comprising: a trip unit disposed within the elongated housing, the trip unit comprising a fuse element and an actuator for severing the fuse element, and a processor in electrical communication with the trip unit. The processor is adapted to monitor electrical current. Responsive to the processor detecting a predetermined prescribed electrical current, the processor is adapted to signal the actuator to sever the fuse element. The processor is programmable to selectively adjust the predetermined prescribed electrical current, thereby enabling the fuse to have a plurality different current ratings.

The fuse may be a boric acid expulsion fuse, and the actuator may be a chemical firing mechanism, wherein the chemical firing mechanism severs the fuse directly, without requiring a separate electrical switch.

BRIEF DESCRIPTION OF THE DRAWINGS

A full understanding of the disclosed concept can be gained from the following description of the preferred embodiments when read in conjunction with the accompanying drawings in which:

FIG. 1A is a side elevation view of a fuse in accordance with an embodiment of the disclosed concept;

FIG. 1B is a section view taken along line 1B-1B of FIG. 1A;

DESCRIPTION OF THE PREFERRED EMBODIMENTS

Figure 2:
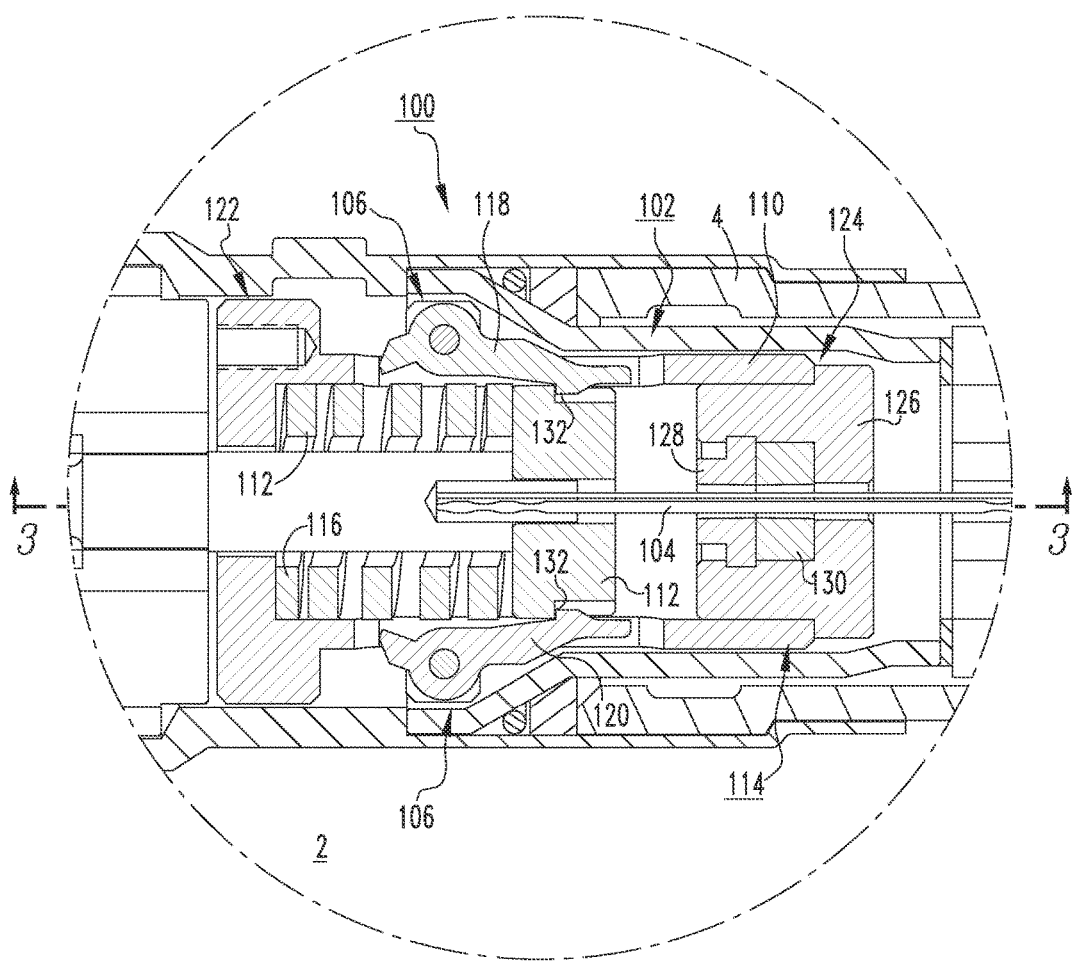
FIG. 2 is an enlarged section view of a portion of the fuse of FIG. 1B, also showing a trip mechanism therefor, shown in the closed position.
Figure 3:
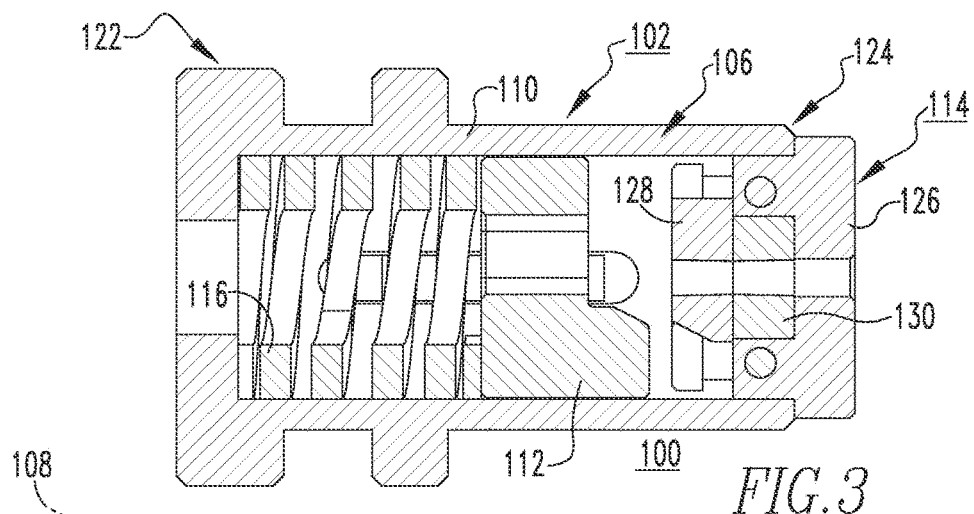
FIG. 3 is a section view taken along line 3-3 of FIG. 2.

Directional phrases used herein, such as, for example, left, right, clockwise, counterclockwise and derivatives thereof, relate to the orientation of the elements shown in the drawings and are not limiting upon the claims unless expressly recited therein.

As employed herein, the term "fastener" refers to any suitable connecting or tightening mechanism expressly including, but not limited to, rivets, pins, screws, bolts and the combinations of bolts and nuts (e.g., without limitation, lock nuts) and bolts, washers and nuts.

As employed herein the term "prescribed electrical current" shall mean the predetermined electrical current value at which the disclosed trip mechanism will trigger the fuse to interrupt current flow. The predetermined electrical current value at which the tripping action is initiated is controlled by an inverse function of time. In accordance with the disclosed concept, the trip mechanism is "selectable" meaning that it can be programmed or otherwise suitably adapted or adjusted to change the prescribed electrical current, thereby changing the fuse rating.

As employed herein, the statement that two or more parts are "coupled" together shall mean that the parts are joined together either directly or joined through one or more intermediate parts.

As employed herein, the term "number" shall mean one or an integer greater than one (i.e., a plurality).

FIGS. 1A and 1B show a fuse such as, for example and without limitation, a boric acid expulsion fuse 2, employing a selectable trip mechanism 100 (FIG. 1B), in accordance with the disclosed concept.

The fuse 2 generally includes an elongated housing 4 having opposing first and second ends 6,8. A first electrical terminal 10 is coupled to the first end 6, and a second electrical terminal 12 is coupled to the second end 8, as best shown in the section view of FIG. 1B. A contact member 14 is disposed within the elongated housing 4 and is structured to move with respect to a boric acid interruption medium, as is generally well known in the art. It will be appreciated that although the non-limiting example embodiment shown and described herein is illustrated in connection with such a boric acid fuse 2, it is foreseeable that the disclosed concept could be employed with any other known or suitable alternative boric acid fuse design (not shown), or any other expulsion fuse design (not shown), including, for example and without limitation, fuse links, open cutouts, and vacuum interrupters.

The trip mechanism 100 includes a trip unit 102 disposed within the elongated housing 4 proximate the first end 6 thereof. As will be described in greater detail hereinbelow, the fuse unit 102 includes a fuse element 104, and an actuator 106 for severing the fuse element 104. A processor 108 (shown in simplified form in FIG. 4; see also processor 208 of FIGS. 6 and 7) is in electrical communication with the trip unit 102, and is adapted to monitor electrical current. In response to the processor 108 (FIG. 4), 208 (FIGS. 6 and 7)) detecting a predetermined prescribed electrical current, the processor 108 (FIG. 4), 208 (FIGS. 6 and 7) is adapted to signal the actuator 106 to sever the fuse element 104.

Accordingly, the disclosed trip mechanism 100 provides a relatively simple and effective mechanical actuator 106 that is structured to sever the fuse element 104 directly, without requiring a separate high-speed electrical switch. In this manner, the disclosed fuse 2 advantageously maintains the high-speed performance characteristics of the fuse 2, without the need for the complex high-speed switches employed by conventional electronically controlled fuse designs (not shown), which are expensive to manufacture. Moreover, the disclosed trip mechanism 100, by cutting the fuse element 104 directly, efficiently and effectively initiates interruption, without the need of a substantial over-current to ensure proper interruption.

The processor 108 (FIG. 4), 208 (FIGS. 6 and 7) is programmable to selectively adjust the predetermined prescribed electrical current at which the actuator 106 will sever the fuse element 104. Accordingly, the disclosed trip mechanism 100 enables the same fuse 2 to have a plurality of different current ratings. This, in turn, allows for a product to be manufactured with a relatively low cost, which can be employed in a variety of different applications. It will further be appreciated that any known or suitable alternative actuator (e.g., without limitation chemical firing mechanism), other than the actuators 106 (FIGS. 1B and 2-5) and 206 (FIGS. 6 and 7) shown and described herein, could be employed, without departing from the scope of the disclosed concept.

EXAMPLE 1

As shown in FIGS. 2-5, the actuator may be a fuse trigger assembly 106, which is movable between a first position (FIGS. 2 and 3) corresponding to the fuse element 104 (shown in FIG. 2) remaining intact, and a second position (FIGS. 4 and 5) corresponding to the fuse element 104 (not shown in FIGS. 4 and 5, but see fuse element 104 of FIG. 2) being severed to initiate interruption of the circuit.

Figure 4:
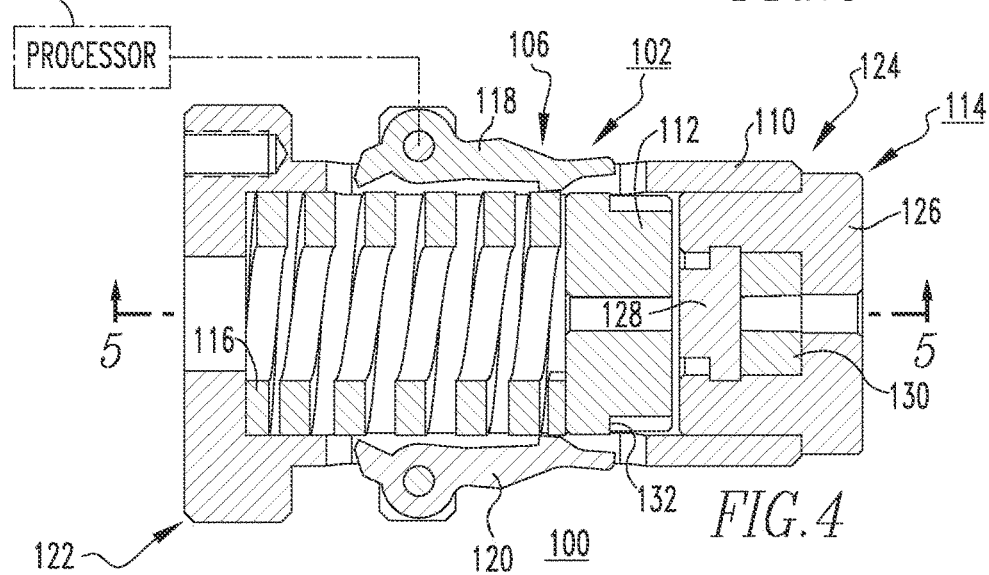
FIG. 4 is a section view showing the trip mechanism in the open position.
Figure 5:
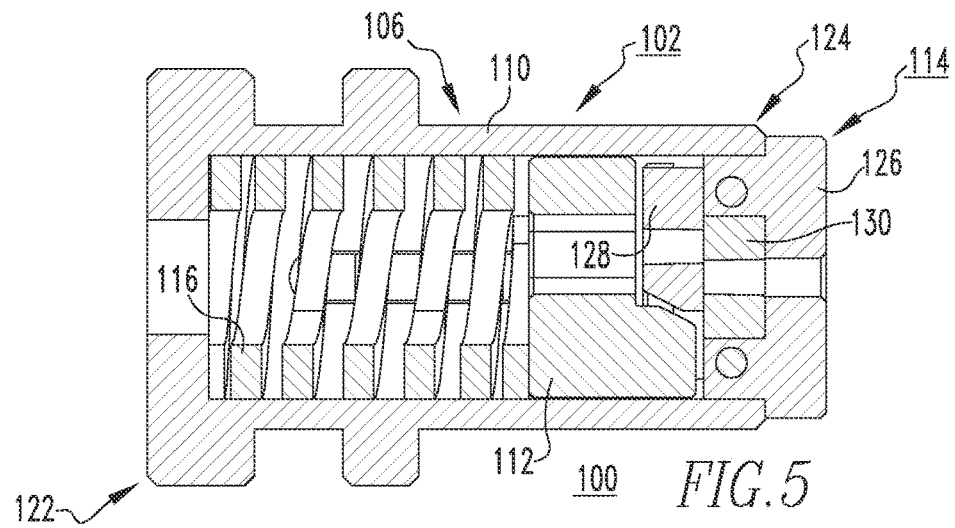
FIG. 5 is a section view taken along line 5-5 of FIG. 4.

The example fuse trigger assembly 106 includes a trigger housing 110, a movable member 112, a plug assembly 114, a spring 116 for biasing the movable member 112 toward the plug assembly 114, and a number of pawls 118,120 (FIGS. 2 and 4) (two are shown) pivotably coupled to the trigger housing 110, as shown in FIGS. 2 and 4. The trigger housing 110 includes opposing first and second ends 122,124. The plug assembly 114 includes a plug 126 and a number of inserts 128,130 (two are shown) movably coupled to the plug 126. The plug 126 is coupled to the second end 124 of the trigger housing 110. The spring 116 is disposed within the trigger housing 110 between the first end 122 of the trigger housing 110 and the movable member 112. The movable member 112 includes an edge 132 (FIGS. 2 and 4). In operation, when the fuse trigger assembly 106 is disposed in the first position of FIG. 2, the pawls 118,120 engage the edge 132. That is, the pawls 118,120 function to prevent the movable member 112 from moving (e.g., to the right from the perspective of FIGS. 2-5) toward the plug 126. When the processor 108 (shown in simplified form in FIG. 4) detects the predetermined prescribed electrical current, as previously discussed, the processor 108 (FIG. 4) actuates the trip unit 102. In response, the pawls 118,120 pivot (e.g., pawl 118 pivots counterclockwise from the perspective of FIG. 4, and pawl 120 pivots clockwise from the perspective of FIG. 4) to disengage the edge 132 and release the movable member 112, as shown in FIG. 4. Responsive to the movable member 112 being released and moving (e.g., to the right from the perspective of FIGS. 2-5) toward the second position, shown in FIGS. 4 and 5, the inserts 128,130 of the plug assembly 114 move with respect to the plug 126 in a manner which severs the fuse element 104 (shown in FIG. 2).

EXAMPLE 2

Figure 6:
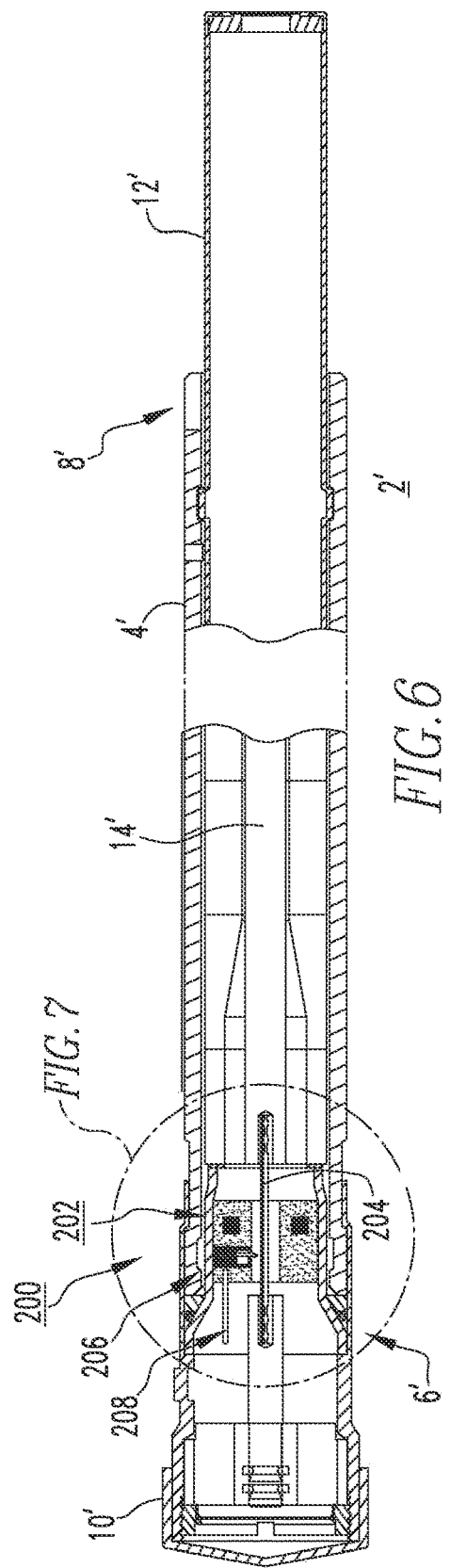
FIG. 6 is a section view of a portion of a fuse and trip mechanism therefor, in accordance with another embodiment of the disclosed concept.

FIG. 6 shows a fuse 2' in accordance with another non-limiting example embodiment of the disclosed concept. Like the fuse 2 described hereinabove with respect to FIGS. 1A-5, fuse 2' includes an elongated housing 4' having opposing first and second ends 6',8' and first and second electrical terminals 10',12', respectively coupled thereto. A contact member 14' is disposed within the elongated housing 4'.

Figure 7:
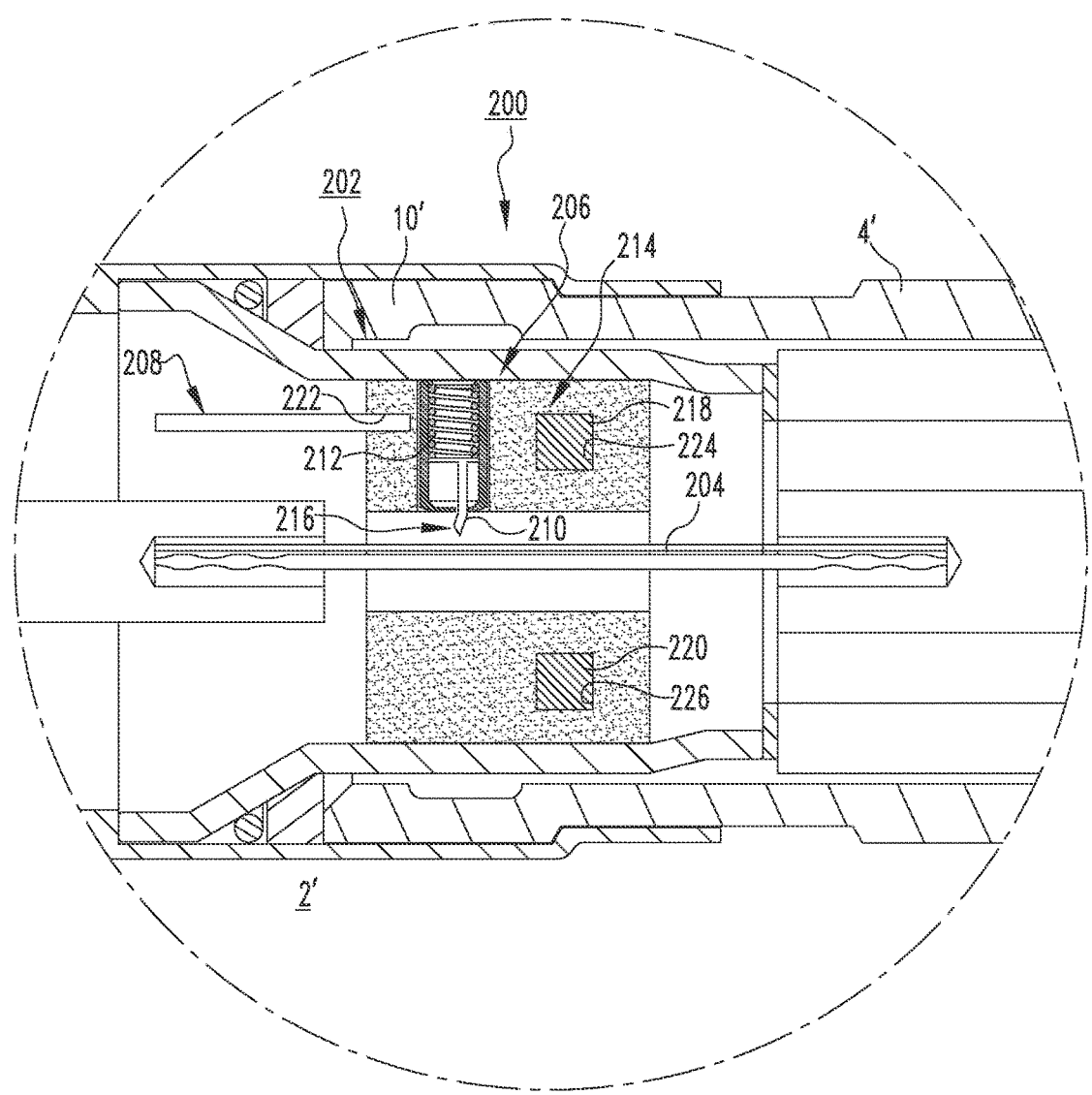
FIG. 7 is an enlarged section of a portion of the fuse and trip mechanism therefor of FIG. 6.

Continuing to refer to FIG. 6, and also to FIG. 7, the fuse trip mechanism 200 includes a trip unit 202 disposed within the elongated housing 4' and including a fuse element 204 and an actuator 206 for severing the fuse element 204. The trip mechanism 200 further includes a processor such as, for example and without limitation, a processor circuit 208. As previously discussed, when the processor 208 detects a predetermined prescribed electrical current, the processor circuit 208 signals the actuator 206 to sever the fuse element 204, thereby triggering the fuse 2' to interrupt the flow of electrical current. The processor circuit 208 is programmable to selectively adjust the predetermined prescribed electrical current. In this manner, the same fuse 2' may be adapted to have a variety of current ratings for use in a variety of different applications. It will be appreciated that the processor circuit 208 (see also processor 108 shown in simplified form in FIG. 4) can be "programmable" in that it can be programmed or otherwise suitably adapted or replaced. That is, the processor circuit 208 or other suitable processor (not shown) could be replaced with a different processor circuit (not shown) that is adapted to actuate the actuator 206 in response to detecting a different predetermined prescribed electrical current. Alternatively, it is also within the scope of the disclosed concept for the entire trip mechanism 200 (see also trip mechanism 100 of FIGS. 1B-5), or the trip unit 202 (see also trip unit 102 of FIGS. 1B-5) thereof, to be replaced or exchanged while keeping the remainder of the fuse 2' (see also fuse 2 of FIGS. 1A, 1B and 2) uncharged.

The actuator 206 may be a cutting mechanism 210 for cutting the fuse element 204, and may include a biasing member 212 for biasing the cutting mechanism toward the fuse element 204. In the example of FIGS. 6 and 7, the actuator 206 further includes a mount 214, and the biasing member is a spring 212. The mount 214 mounts the cutting mechanism 212 and spring 212 to the first electrical terminal 10, as best shown in FIG. 7. More specifically, the cutting mechanism comprises a protrusion 210 extending outwardly from the mount 214 toward the fuse element 204, and including a knife edge 216.

In operation, in response to detecting the aforementioned predetermined prescribed electrical current, the processor circuit 208 is adapted to signal the trip unit 202 to actuate the cutting mechanism 210, in order to cut the fuse element 204 with the knife edge 216. More specifically, the protrusion 210 is released to move (e.g., downward from the perspective of FIG. 7), in order that the knife edge 216 engages and cuts the fuse element 204.

As best shown in FIG. 7, the trip mechanism 200 may further include a number of transformers 218,220 (two are shown), which are in electrical communication with the printed circuit board 208. The mount in the example shown, is a plastic insert 214 having a slot 222 and number of recesses 224,226 (two are shown). The processor circuit 208 comprises a printed circuit board which is disposed within the slot 222, and each of the current transformers 218,220 is disposed in a corresponding one of the recesses 224,226.

Accordingly, the disclosed trip mechanism 100,200 provides an effective device for directly severing the fuse element 104,204, thereby maintaining the high-speed performance characteristics of the fuse 2,2', without requiring complex and expensive high-speed electrical switches. Furthermore, the disclosed trip mechanism 100,200 is selectable to enable the same fuse 2,2' to have multiple ratings. This advantageously permits the same unit to be employed in a variety of different applications.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A fuse comprising:
    an elongated housing extending between a first end and a second end along a longitudinal axis;
    a first electrical terminal coupled to the first end;
    a second electrical terminal coupled to the second end;
    a contact member disposed within the elongated housing; and
    a trip mechanism comprising:
        a trip unit disposed within said elongated housing, said trip unit comprising:
            a fuse element extending along the longitudinal axis, and
            an actuator positioned adjacent said fuse element, said actuator comprising a cutting mechanism and a biasing member, the cutting mechanism being moveable generally perpendicular to the longitudinal axis by the biasing member from a first position in which the fuse element is intact and a second position in which the fuse element has been severed by the cutting mechanism, and
        a processor in electrical communication with said trip unit, said processor being programmed to monitor electrical current,
    wherein responsive to said processor detecting a predetermined prescribed electrical current, said processor being programmed to signal said actuator to sever said fuse element;
    wherein said processor is programmed to enable said predetermined prescribed electrical current to be changed, thereby enabling said fuse to have a plurality different current ratings;
    wherein said actuator further comprises a mount;
    wherein said biasing member is a spring;
    wherein said mount mounts said cutting mechanism and said spring to said first electrical terminal;
    wherein said cutting mechanism is a protrusion having a knife edge;
    wherein said protrusion extends outwardly from said mount toward said fuse element;
    wherein said processor comprises a printed circuit board;
    wherein, in response to detecting said predetermined prescribed electrical current, said printed circuit board signals said trip unit to actuate said cutting mechanism, in order to cut said fuse element with said knife edge;
    wherein said processor further comprises a number of current transformers in electrical communication with said printed circuit board;
    wherein said mount is a plastic insert including a slot and a number of recesses;
    wherein said printed circuit board is disposed in said slot; and
    wherein each of said current transformers is disposed in a corresponding one of said recesses.

* * * * *